April 4, 1950     H. L. DUNSDON     2,502,835
HARROW LIFT DEVICE
Filed July 6, 1944
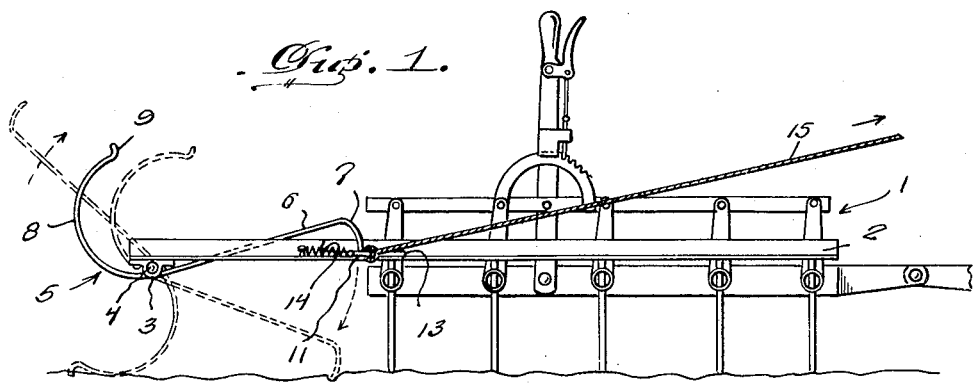
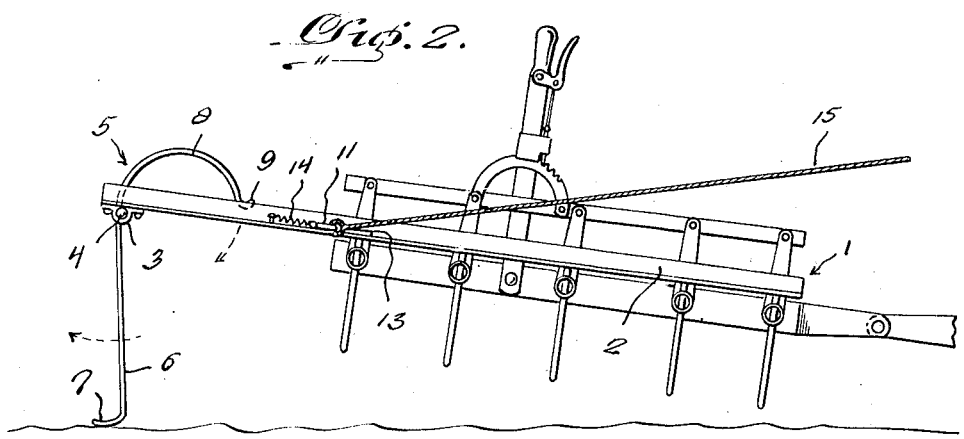
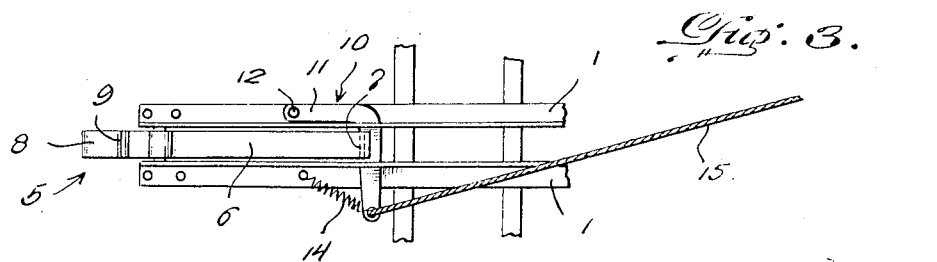
Inventor
Harry L. Dunsdon, Patented Apr. 4, 1950

2,502,835

UNITED STATES PATENT OFFICE 2,502,835

HARROW LIFT DEVICE

Harry L. Dunsdon, Edgeley, N. Dak.

Application July 6, 1944, Serial No. 543,642

2 Claims. (Cl. 55—34)

The present invention relates to new and useful improvements in tractor-drawn farm harrows and has for its primary object to provide, in a manner as hereinafter set forth, an implement of this character comprising unique means, controlled from the operator's seat of the tractor, for elevating the harrow to clear the teeth thereof of all trash without the necessity of stopping.

Other objects of the invention are to provide an improved harrow of the aforementioned character which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of a harrow embodying the present invention.

Figure 2 is a side elevational view, showing the harrow raised for clearing the teeth.

Figure 3 is a top plan view of the invention.

Referring now to the drawing in detail, it will be seen that the embodiment of the invention which has been illustrated comprises a pair of spaced, parallel bars 1 of angle iron which are mounted longitudinally on a conventional harrow 2 in a manner to project rearwardly therefrom. Mounted in bearings 3 beneath the rear end portions of the bars 1 is a transverse pin or shaft 4. Mounted on the shaft 4 is a rotatable jack which is designated generally by the reference character 5.

The jack 5 is of suitable metal and includes a straight elevating arm 6 which terminates, at its free end, in a ground-engaging foot 7. Extending from the pivoted end of the elevating arm 6 is an integral, arcuate return arm 8 which is provided on its free end with a hook 9.

A trip 10 is provided for controlling the jack 5. The trip 10 includes an angular bar 11 having one end portion pivotally secured, at 12, to one of the bars 1. The angularly extending free end portion of the bar 11 traverses the bars 1, being operable in slots 13 which are provided therefor. A coil spring 14 is connected to the free end portion of the bar 11 for positioning said bar in the path of the arm 6. A trip rope 15, operable from the driver's seat of the tractor, is connected to the bar 11 for releasing the jack 5.

It is thought that the operation of the invention will be readily apparent from a consideration of the foregoing. Briefly, the elevating arm 6 of the jack 5 normally rests by gravity on the bar 11 of the trip 10, as seen in Figure 1 of the drawing. The harrow is pulled forwardly and when it is desired to clear said harrow of accumulated trash, the bar 11 is swung forwardly through the medium of the trip rope 15 against the tension of the spring 14 for freeing the jack 5. The arm 6 then swings downwardly by gravity and the foot 7 engages the ground. As the harrow continues to move forwardly and the jack 5 rotates, the arm 6 elevates the rear end of said harrow in the manner illustrated in Figure 2 of the drawing for clearing the teeth thereof of cornstalks and other trash. When the harrow 2 drops to lowered position again the arcuate arm 8 of the jack 5 engages and rolls on the ground for returning the arm 6 to its former position on the bar 11. The device is now ready for the next operation.

It is believed that the many advantages of a harrow clearing device constructed in accordance with the present invention will be readily understood and although a preferred embodiment is as illustrated and described, it is to be understood that changes in the details of construction may be resorted to which will fall within the scope of the invention as claimed.

What is claimed is:

1. A harrow clearing device comprising a pair of spaced, parallel angle iron bars mounted longitudinally on a harrow and projecting rearwardly therefrom, said bars having longitudinal slots therein, a shaft extending between the rear end portions of the bars, a rotary elevating jack for the harrow mounted on said shaft, said jack including a ground-engaging lifting arm and further including an arcuate ground-engaging return arm for said lifting arm, an angular bar pivotally mounted on one of the first-named bars for horizontal pivotal movement in the slots, said angular bar being engageable by the lifting arm of the jack for releasably supporting said jack in inoperative position, and a trip rope connected to the angular bar for actuating same for releasing the jack, said lifting arm counterbalancing the return arm to normally maintain the return arm in a raised position.

2. A harrow clearing device comprising spaced longitudinally extending bars mounted on a harrow and projecting rearwardly therefrom, an elevating jack arranged between the rear end portions of said bars and mounted for rotation about a horizontal axis, said jack including a substantially straight lifting arm provided with a ground-engaging foot and an arcuate return arm having its free end formed for rolling contact with the ground, the respective arms projecting from opposite sides of said axis, and an angular bar pivotally mounted on one of the longitudinally-extending bars and engageable by said lifting arm for releasably supporting said jack in inoperative position.

HARRY L. DUNSDON.

REFERENCES CITED

The following references are of record in the file of this patent:

UNITED STATES PATENTS

| Number | Name | Date |
|---|---|---|
| 696,697 | Thompson | Apr. 1, 1902 |
| 1,220,136 | Miller | Mar. 20, 1917 |
| 1,553,273 | Underwood | Sept. 8, 1925 |
| 2,082,795 | Finck | June 8, 1937 |